United States Patent [19]

Cartner

[11] 3,967,531

[45] July 6, 1976

[54] CONTINUOUS OR CHAIN BROACHING MACHINE

[75] Inventor: David J. Cartner, Royal Oak, Mich.

[73] Assignee: Swift Engineering Company, Inc., Royal Oak, Mich.

[22] Filed: Nov. 18, 1974

[21] Appl. No.: 524,734

[52] U.S. Cl.......................................... 90/78; 90/70; 90/95
[51] Int. Cl.² .................. B23D 37/18; B23D 41/00
[58] Field of Search ...................... 90/78, 70, 63, 95

[56] References Cited
UNITED STATES PATENTS

| | | | |
|---|---|---|---|
| 1,692,564 | 11/1928 | Oakley..................................... | 90/78 |
| 1,933,080 | 10/1933 | Stainfield............................. | 90/78 X |
| 2,080,464 | 5/1937 | Doan ..................................... | 90/78 X |
| 2,751,823 | 6/1956 | Freter.................................... | 90/78 X |
| 3,855,901 | 12/1974 | Girardi.................................... | 90/78 |

FOREIGN PATENTS OR APPLICATIONS

| | | | |
|---|---|---|---|
| 632,681 | 11/1949 | United Kingdom..................... | 90/78 |

*Primary Examiner*—Othell M. Simpson
*Assistant Examiner*—W. R. Briggs
*Attorney, Agent, or Firm*—Whittemore, Hulbert & Belknap

[57] ABSTRACT

An improvement in a continuous flexible drive, preferably a chain, broaching machine in which a transmission, preferably a worm-worm gear speed reducer transmission is connected to a driving motor and to a sprocket, or a pair of sprockets, carried by a drive shaft which in turn is connected by chain means to a sprocket or a pair of sprockets on a shaft which drives the chain means of a chain broaching machine. The input unit including the transmission is designed in conformity with the drive end of the broaching machine to permit placement of input drive mechanism in different positions so as to provide freedom in placement of a plurality of broaching machines without interfering with each other.

14 Claims, 12 Drawing Figures

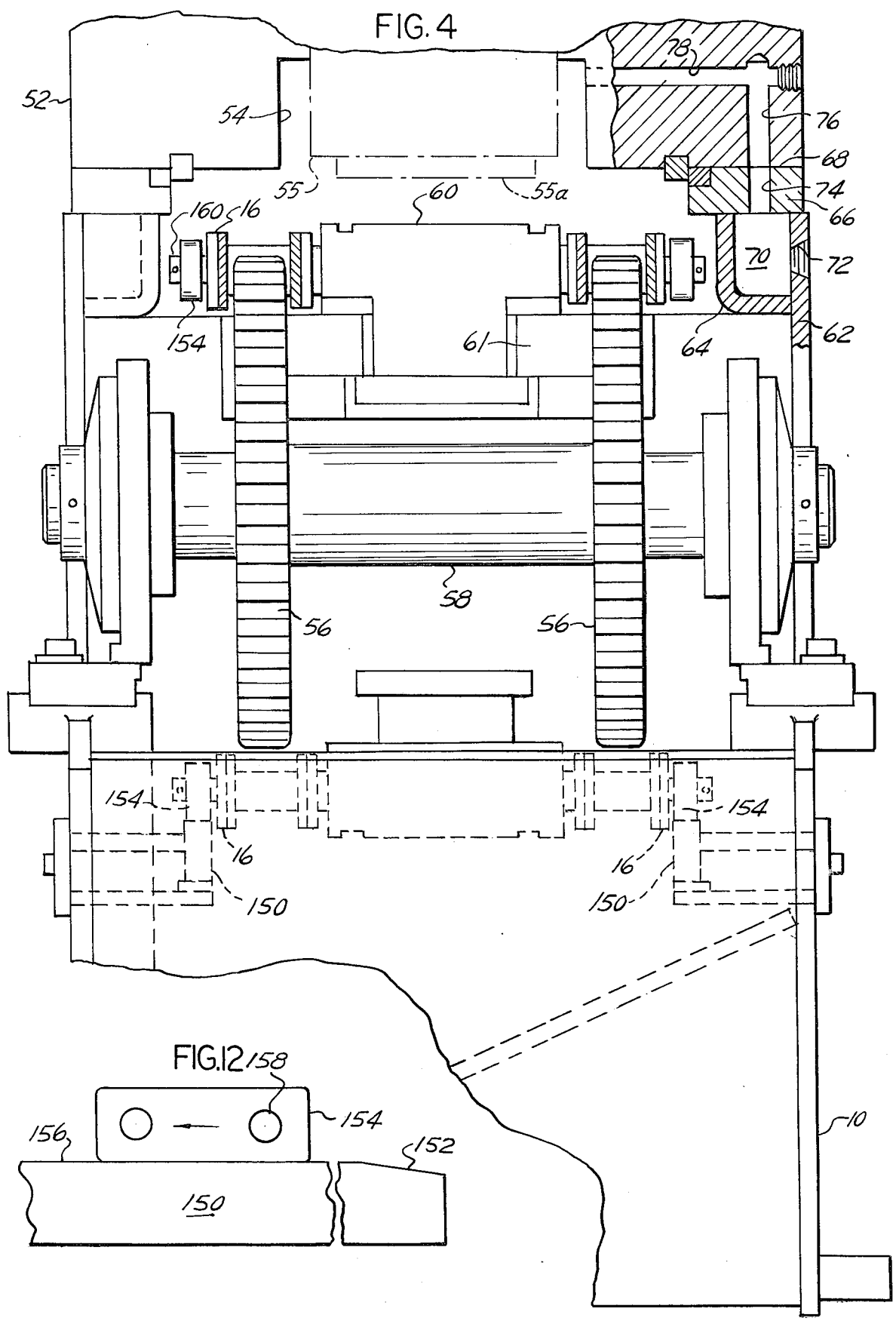

CONTINUOUS OR CHAIN BROACHING MACHINE

BRIEF SUMMARY OF THE INVENTION

Chain or continuous broaching machines are standard production machines and in general provide an elongated tunnel, usually horizontal, and a multiplicity of broaching tools are placed in sequence on the machine frame within the tunnel. The frame is provided with accurately located guide means and work supporting fixtures are mounted on one or more endless chains which move a series of work pieces through the tunnel. The fixtures have means engaging the guide means on the frame so as to locate work pieces with precision relative to the broaches and to produce accurately broached parts.

In some cases, particularly where the work piece being machined is relatively large, provision is made for supporting the work piece in a stationary position and using the chain to advance a sequence of broaching tools past the work piece.

In the past the means for driving the chain which carries the work supporting fixtures, or in some cases the broaching tools, comprises gearing interconnecting a drive motor with the shaft carrying the two driving sprockets which in turn engage one end of and drive the pair of chains, one flight of which advances through the tunnel.

In accordance with the present invention, special power input means is provided which comprises a motor means having output shaft means connected to speed reducer means. The output of the speed reducer means comprises one or a pair of rotary drive elements, preferably sprockets, which are connected by one or a pair of flexible drive elements, preferably chains, to a corresponding number of rotary drive elements, preferably sprockets carried by the input shaft which drives the chain means which advances the work support fixtures (or tools) through the tunnel.

With this arrangement the complicated and expensive special gearing which has been used in the past for connecting the motor to the shaft carrying the chain drive sprockets is avoided. In addition, where the speed reducer transmission means provides two shaft portions each having a rotary drive element on the main drive shaft of the chain broaching machine, a particular economy is effected because much smaller shafts are required than where the entire load is carried by a shaft and a single drive element.

Finally, the novel drive unit permits great flexibility in adaptation to a standard chain broaching machine. It is often desirable to place a battery of broaching machines in close parallel relationship to each other, in which case the power input may be positioned above or beyond one end of the machine. Alternatively, where space suggests such an arrangement, the complete power input unit may be positioned at the side of the broaching machine adjacent one end thereof.

A further improved feature of the present broaching machine is in the provision of a special frame design in which a manifold is provided by welding elongated trough forming strip to one side of a mounting plate and closing the space between the mounting plate and strip at the top with a bar having a tunnel cover mounting surface thereon. The parts are continuously welded and thus provide an elongated coolant manifold which extends the full length of the tunnel. The tunnel itself may be provided at appropriate intervals with passages communicating with the interior of the manifold to provide a supply of coolant at each of the broaching stations spaced along the machine.

BRIEF DESCRIPTION OF THE DRAWINGS

FIG. 4 is an enlarged fragmentary view of the other end of the machine, with parts broken away, illustrating a detail of coolant supply.

FIG. 12 is a fragmentary view showing a skate connected to the fixture advancing chain.

DETAILED DESCRIPTION

Figure 1:
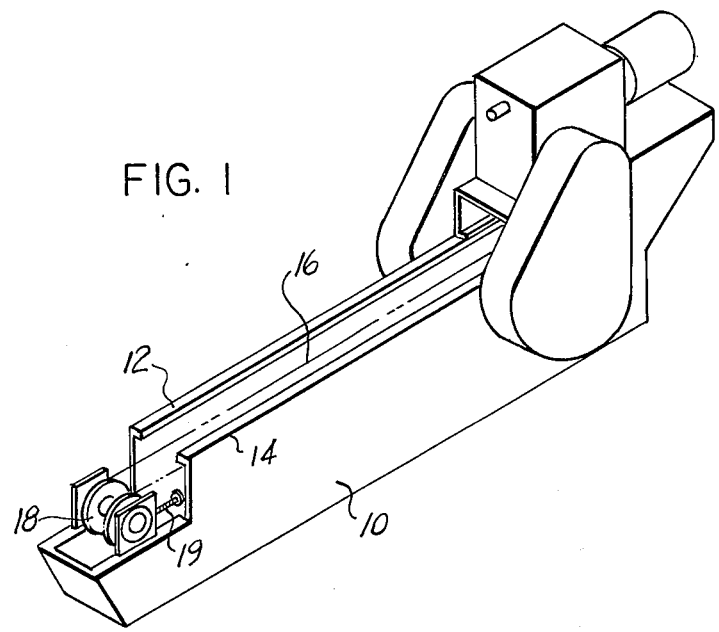
FIG. 1 is a perspective view partly diagrammatic of a chain broaching machine with parts removed.
Figure 3:
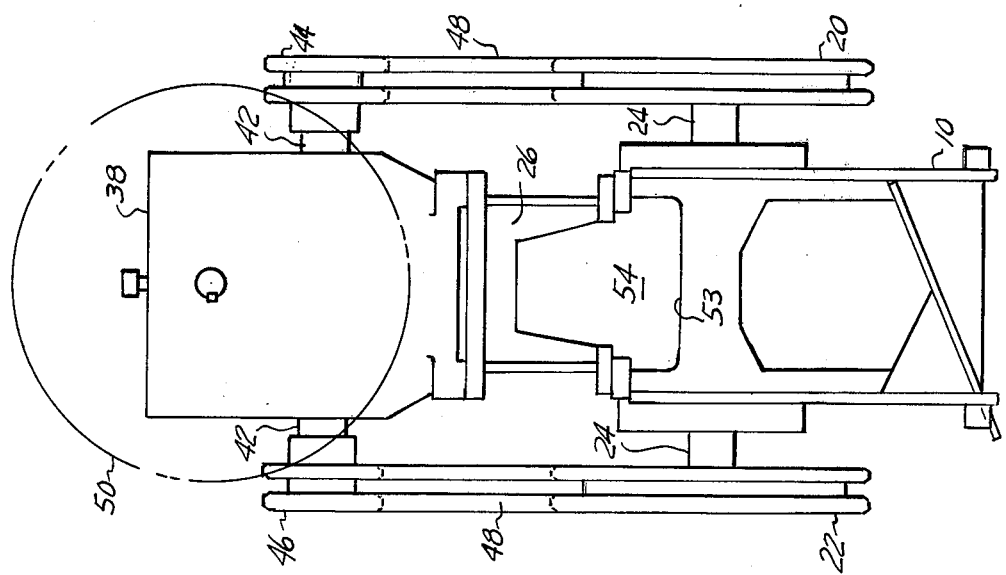
FIG. 3 is an end elevation of the machine looking to the left in FIG. 2.
Figure 2:
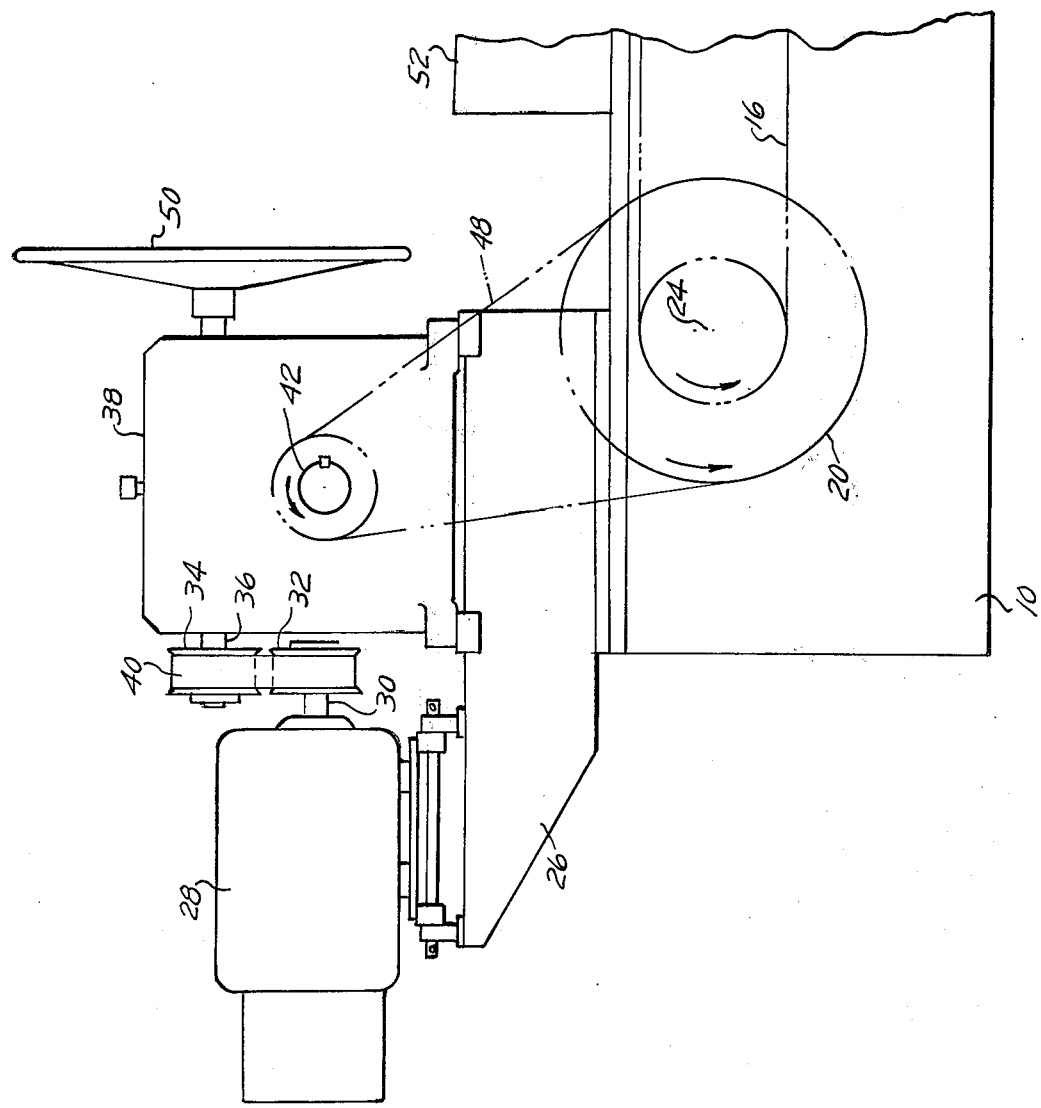
FIG. 2 is an enlarged elevational view of the end of the broaching machine shown in FIG. 1.

Referring first to FIG. 1 there is shown a base 10 of a continuous chain broaching machine having side plates 12 and 14 on which the broaching tunnel cover (not shown) is supported. A succession of work pieces are advanced longitudinally through the tunnel by chain means diagrammatically indicated at 16, these chain means being shown as two chains in number and having idler sprockets 18 provided adjacent the end of the machine with take-up means diagrammatically indicated at 19. Drive sprockets 20 and 22 are provided, as best seen in FIGS. 2 and 3, these sprockets being connected to opposite ends of an input fixture drive shaft 24 which drives the fixture advancing chains 16. Chains 16 of course have the upper runs adjacent the broaching tools, not shown in this Figure, and lower return runs as shown.

The base 10 is provided with a drive support 26 adjacent the input end and on the support 26 is an electric motor 28 having an output shaft 30 carrying a driving sheave 32 which in turn is connected to a driven sheave 34 carried by input shaft 36 of a transmission housing 38. Sheaves 32 and 34 are interconnected by belting 40, preferably in the form of a timing belt.

Within the transmission housing 38 there is provided step-down gearing including a worm and worm wheel pair operating as a very efficient yet inexpensive step-down transmission. In a specific embodiment of the present invention the step-down ratio provided was 40:1.

As best seen in FIG. 3 the output shaft 42 of the transmission housing 38 extends from opposite sides of the housing and at opposite ends of the shaft is provided with pairs of rotary drive means such as sprockets 44 and 46 which are interconnected to corresponding rotary drive means such as the sprockets 20 and 22 by flexible drive means such as the input means 48.

A hand wheel 50 is provided for setup and may be used to produce manual rotation of the output shaft means of the speed reducer.

As best seen in FIG. 4, mounted on the base 10 is a tunnel cover 52 which closes an upwardly open channel 53 (see FIG. 3) provided in the base 10, and defines with the cover the longitudinally or horizontally extending tunnel 54.

It will be understood that within the tunnel 54 there is usually mounted a succession of stepped broaching tools or an elongated broaching tool having a succession of stepped cutting elements to perform successive cuts on work pieces as they are advanced by the chains 16 through the tunnel. A fixture 55 is diagrammatically indicated in dot and dash lines in tunnel 54, and may carry broach tools or work pieces, diagrammatically indicated at 55a.

In FIG. 4 there is also shown in fragmentary form a further detail of the machine construction. In this Figure, looking at the end of the machine opposite to the input end at which the motor and transmission are mounted, are a pair of idler sprockets 56 mounted on a shaft 58. A work supporting fixture is indicated at 60 and it is to be understood that a plurality of such work supporting fixtures are secured at appropriate intervals between chains trained over the sprockets 56. Fixtures 60 are guided on guide rails 61.

The frame 10 of the machine includes side plates 62 to which are welded strips which may be L-shaped bars or angle irons 64, which together with the upper edge portion of the plates 62 define upwardly open channels, the tops of which are closed by bars 66 extending the full length of the tunnel and having a tunnel cover mounted thereon. It will be seen that the bars 66 together with the angle irons 64 and the upper edges of the plates 62 define manifolds 70 which extend the full length of the tunnel. Tapered and threaded inlet openings 72 are provided for supplying oil to the interior of the manifolds. The elongated bars 66 are provided with a multiplicity of openings 74 and the lower edges of the tunnel cover 52 are drilled as indicated at 76 and 78 to provide passages for the flow of coolant.

Suitable fittings are supplied at the interior of the tunnel cover 52 to lead coolant as required to the broaching stations located in spaced relation along the tunnel.

As best seen in FIGS. 2 and 3, since the speed reducer transmission means 38 has two output shaft portions 42, these shaft portions need be designed to transmit only half as much load as would be the case if a single output shaft and single transmission means structure transmitted the entire load. Sprockets 20, 22 are at opposite ends of fixture drive shaft 24 and this permits the employment of substantially smaller diameter shaft portion 42 and 24 with resultant economies.

Figures 5, 6:
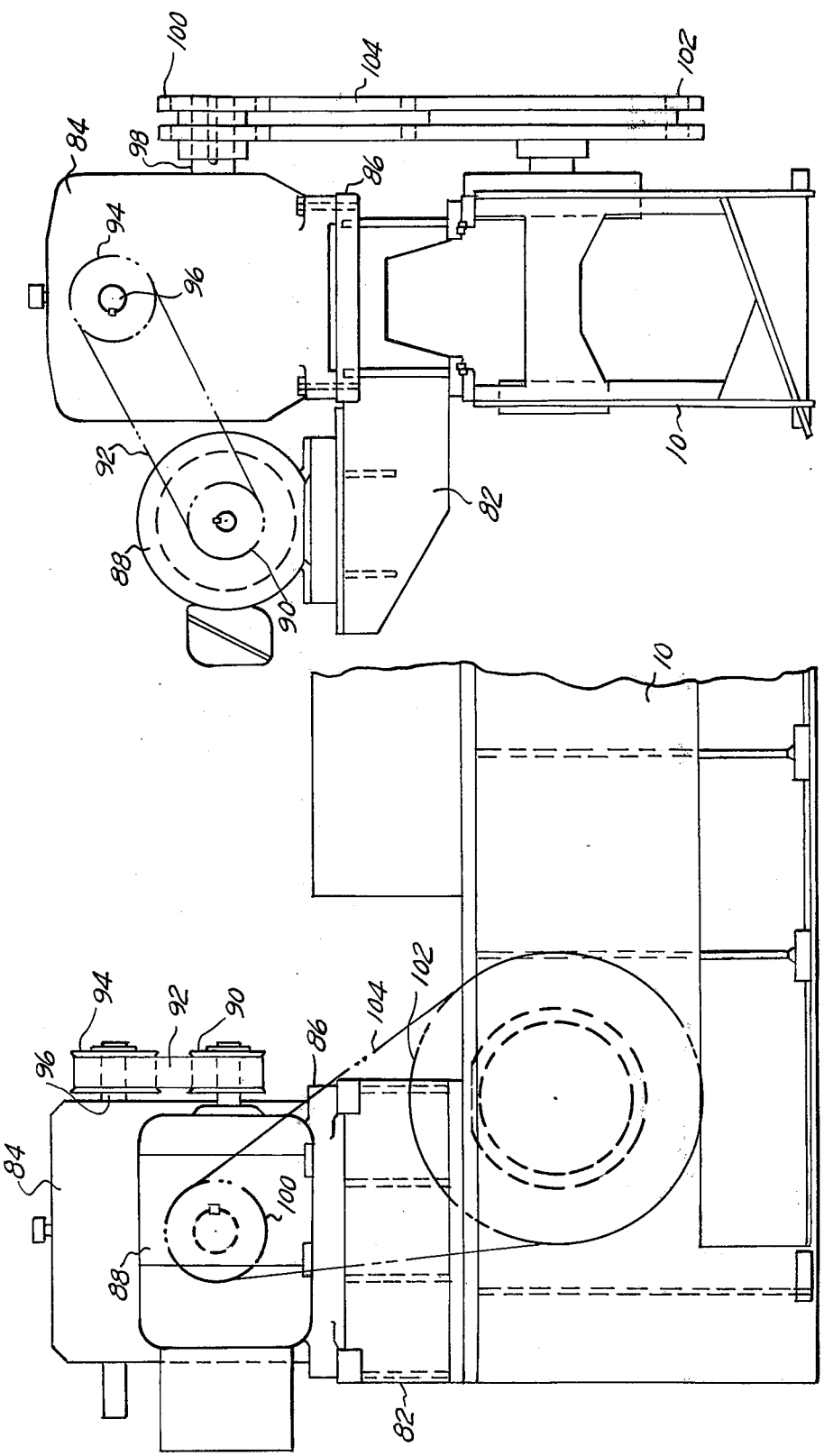
FIG. 5 is a fragmentary side view at one end of the machine illustrating a somewhat different position of the input drive unit.
FIG. 6 is an end view of the structure shown in FIG. 5.

However, the present invention is not necessarily limited to the provision of a transmission which includes two output shafts or shaft portions. In FIGS. 5 and 6 there is illustrated a somewhat different arrangement. In these Figures the machine frame 10 is provided at one end with a laterally extending motor mounting bracket 82, and a speed reducer transmission housing 84 is supported on a mounting plate 86 forming a part of the bracket 82 and located above the input or driving end of the chain broaching machine.

As before, an electric motor 88 mounted on the bracket 82 is connected by a sheave 90, belting 92, and a sheave 94 to an input shaft 96 of the transmission housing 84.

In this case the transmission has a single output shaft 98 carrying a pair of driving sprockets 100 at one end thereof which are connected to driven sprockets 102 by chains 104.

Figure 7:
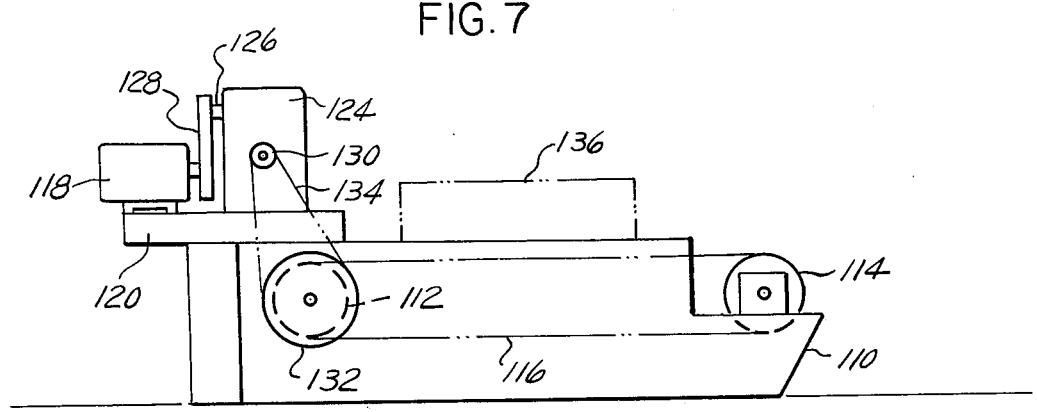
FIG. 7 is a fragmentary side view of the complete machine having the configuration disclosed in FIGS. 1–3.

Referring now to FIG. 7 there is diagrammatically illustrated the machine arrangement of FIGS. 1–3. In FIG. 7, and FIGS. 8–11, corresponding parts are given the same reference characters and the several Figures illustrate different machine configurations.

In FIG. 7 the machine frame 110 mounts the chain drive sprockets 112 and idler sprockets 114 which carry the work advancing chains 116. In this case the drive motor 118 is mounted on a support plate 120 directly at the end of the chain broaching machine frame 110. The transmission housing 124 has its input shaft 26 connected to the motor 118 by the belting 128. An output sprocket 130 is illustrated as connected to the driving sprocket 112 through a driven sprocket 132 by the input chain indicated at 134. The tunnel cover 136 is mounted on the frame 110. In this Figure it will be observed that the speed reducer transmission housing 124 is mounted directly above the power input end of the broaching machine and the driving motor 118 for the transmission is located directly beyond and above the same end of the machine.

Figure 8:
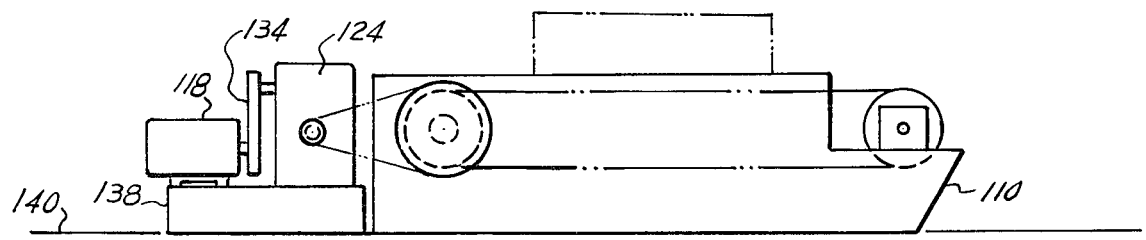
FIG. 8 is a fragmentary side elevation of a machine in which the input unit is located beyond one end of the broaching machine.
Figure 9:
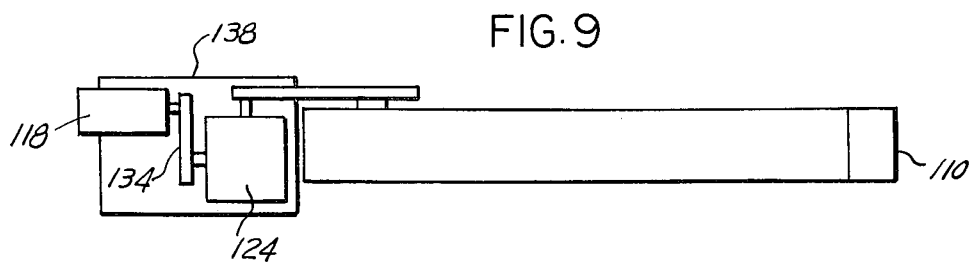
FIG. 9 is a plan view of the machine shown in FIG. 8.

Referring now to FIGS. 8 and 9 there is illustrated a somewhat different arrangement in which the motor 118 is mounted on a support base 138 which rests on the floor 140. The transmission housing 124 also rests on the support base or plate 138 and is connected to the motor 118 by the belting 134. In this case it will be observed that both the motor 118 and the transmission housing 124 are mounted at one end of the machine in line therewith and form a longitudinal extension of the frame.

Figure 10:
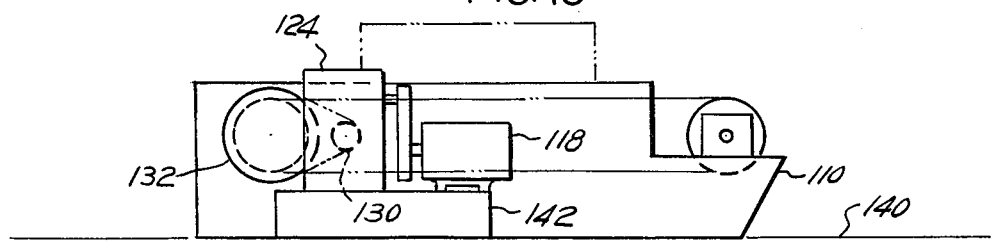
FIG. 10 is a fragmentary side elevation of a broaching machine with the power unit positioned adjacent one side of the machine.
Figure 11:
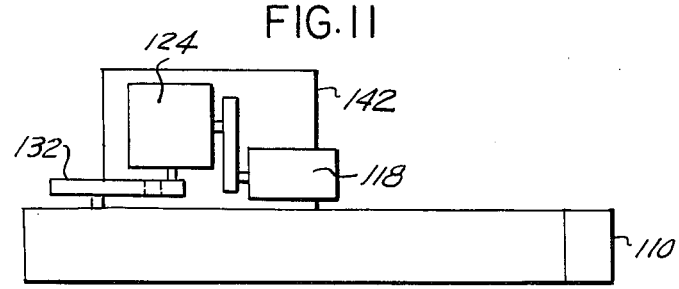
FIG. 11 is a plan view of the machine shown in FIG. 10.

Referring now to FIGS. 10 and 11, the motor 118 and the transmission housing 124 are both mounted on a support plate 142 which is in this instance mounted on the floor 140 at one side of the machine frame 110 and intermediate the ends thereof. Accordingly, the output sheave 130 of the transmission housing is located inwardly of the machine frame 110 with respect to the driving sheave 132 which drives the sprockets which carry the work advancing chains which in turn carry the work supporting fixtures.

It will be seen that in all embodiments of the invention the drive motor and the transmission housing are mounted in the same relative relationship to each other and constitute a power unit adapted to be supported in different positions relative to the basic chain broaching machine as dictated by the desired machine configuration. In all such positiions the output sprocket or sprockets on the speed reducer are located in proper alignment with the fixture drive sprocket or sprockets to permit interconnection between the input chain means.

In FIGS. 2–4 the motor and transmission housing are mounted on the support structure 26. In FIGS. 5 and 6 the motor and transmission housing are mounted on the support structure 82 including the plate 86 to which the transmission housing is secured. In FIG. 7 the motor and transmission housing are mounted on the plate 120. In FIGS. 8 and 9 the motor and transmission housing are mounted on the floor supported plate 138.

In FIGS. 10 and 11 the motor and transmission housing are mounted on the floor supported plate 142.

While other arrangements are possible, the foregoing illustrates the flexibility of machine configuration design permitted by the present invention, and it will be understood that particular configurations are ordinarily dictated by the desirability of mounting a plurality of chain broaching machines in juxtaposition to each other.

In the foregoing, sheaves and belt connections have been illustrated between the motor and the speed reducer and transmission. This arrangement is preferred since speed reduction may be further effected by changing the diameters of the respective sheaves. However, it is within the contemplation of the present invention to provide a direct coupling between the output shaft of the motor and the input shaft of the speed reducer.

As the chain advances work support fixture through the tunnel, the fixtures are guided in exact relationship to the broaching tools, and this of course maintains the upper chain run essentially horizontal. However, special means must be provided to prevent downward sag of the return run of the chain. As seen in FIG. 12, support rails 150 are provided having an inclined ramp 152 at the ends to engage elongated skates 154 and to guide them onto horizontal support surfaces 156. It will be understood that skates 154 are each provided with a pair of spaced openings 158 which receive cross shafts 160 which in turn constitute chain pivot pins and support the fixtures 60.

What I claim as my invention is:

1. A continuous or chain broaching machine comprising an elongated frame, a fixture drive shaft having fixture drive sprocket means adjacent one end of the frame, an idler shaft having driven sprocket means adjacent the other end of said frame, fixture drive chain means trained over said sprockets, a tunnel extending longitudinally of said frame through which one run of said chain means extends, driven sprocket means on said fixture drive shaft, a separate, self-contained power input assembly having a unitary support structure separate from said elongated frame but connected thereto in a selected position, said assembly comprising motor means, speed reducer means connected to said motor means, said speed reducer means having output sprocket means, the output sprocket means of said speed reducer means being aligned with the driven sprocket means on said fixture drive shaft when said unitary support structure is connected to said broaching machine frame in said selected position, and input chain means connecting the output sprocket means of said speed reducer means to the driven sprocket means on said fixture drive shaft.

2. A machine as defined in claim 1 in which the means connecting the motor to the speed reducer comprises sheave and belt means.

3. A machine as defined in claim 1 in which said speed reducer means comprises a single speed reducer unit having a pair of separated shaft portions each having a speed reducer output sprocket thereon, the driven sprocket means on said fixture drive shaft comprising a pair of driven sprockets located at opposite sides of said drive sprocket means each connected by said chain means to one of said pair of speed reducer output sprockets.

4. A machine as defined in claim 3, in which the separated output shaft portions of said speed reducer are end portions of a single shaft.

5. A machine as defined in claim 1, in which said speed reducer means comprises a single housing including worm-wormgear reducer means.

6. A machine as defined in claim 1 in which said unitary support structure for supporting said power input assembly comprising the motor and speed reducer is attachable to said frame in different selected positions relative to said machine frame to align the output sprocket means thereof with the driven sprocket means on said fixture drive shaft for connection thereto by said input chain means.

7. A machine as defined in claim 6, in which said unitary support structure is connected to said frame to locate said speed reducer above the end of said frame at which said driving sprockets are located, and to locate said motor above and beyond the said one end of said frame at the horizontal level of said speed reducer.

8. A machine as defined in claim 6, in which said unitary support structure is connected to said frame to locate said speed reducer directly beyond the end of said frame at which said driving sprockets are located, and to locate said motor beyond said speed reducer at the horizontal level of said frame and speed reducer.

9. A machine as defined in claim 6 in which said unitary support structure is connected to said frame to locate said speed reducer laterally of said frame adjacent the end of said frame at which said driving sprockets are located, and to locate said motor at the side of said frame and at the side of said speed reducer fafing the end of said frame at which said idle sprockets are located.

10. A chain broaching machine comprising an elongated frame, a fixture drive shaft adjacent one end of said frame, a fixture driving sprocket means on said fixture drive shaft, an idler shaft adjacent the other end of said frame, sprocket means on said idler shaft, a fixture drive chain means trained over the sprockets, a tunnel extending longitudinally of the frame through which one run of the chain means extends, driven sprocket means on said fixture drive shaft, and a power input assembly for driving said driven sprocket means, said frame comprising a side plate having a horizontal top edge extending for the length of said tunnel, an elongated strip connected to said side plate with an upper edge thereof spaced horizontally from the top edge of said plate to define therewith an elongated trough, an elongated tunnel cover supporting bar connected to the edges of said plate and strip and forming a manifold extending longitudinally of said trough, a connection for supplying coolant to said manifold, and passage means spaced longitudinally of said manifold for connection of lines for leading coolant to broaching means spaced longitudinally within said tunnel.

11. A machine as defined in claim 10, in which said strip is of L-shaped cross section and form with said side plate a generally rectangular trough.

12. A machine as defined in claim 10, in which said passage comprises openings extending through said bar and communicating with the interior of said manifold.

13. A machine as defined in claim 11, in which said tunnel comprises a cover having a lower edge connected to said bar, said passages including passage portions in the lower edge portion of said cover communicating with the openings through said bar, the passage portions opening to the interior of said cover.

14. A machine as defined in claim 1, in which said frame includes elongated horizontal guide rails below the tunnel to support the return run of said fixture drive chain means, and said fixture drive chain means is provided with elongated support skates slidable on said guide rails as the return run of said chain means moves over said guide rails.

* * * * *